United States Patent [19]

Asada

[11] Patent Number: 6,156,109
[45] Date of Patent: Dec. 5, 2000

[54] WATER-IN-OIL TYPE EMULSION INK FOR STENCIL PRINTING

[75] Inventor: Keisuke Asada, Miyagi-ken, Japan

[73] Assignee: Tohoku Ricoh Co., Ltd., Japan

[ * ] Notice: This patent is subject to a terminal disclaimer.

[21] Appl. No.: 09/290,862

[22] Filed: Apr. 14, 1999

[30] Foreign Application Priority Data

Apr. 27, 1998 [JP] Japan .................................. 10-132722
Mar. 16, 1999 [JP] Japan .................................. 11-070802

[51] Int. Cl.⁷ .................................................. C09D 11/02
[52] U.S. Cl. ..................................... 106/31.26; 106/31.41; 106/31.57; 106/31.73; 106/31.88
[58] Field of Search ............................. 106/31.26, 31.41, 106/31.57, 31.73, 31.88

[56] References Cited

U.S. PATENT DOCUMENTS

| | | | |
|---|---|---|---|
| 5,622,548 | 4/1997 | Zou et al. | 106/31.26 |
| 5,667,570 | 9/1997 | Okuda et al. | 106/31.26 |
| 5,779,777 | 7/1998 | Okuda et al. | 106/31.26 |
| 5,800,599 | 9/1998 | Asada | 106/31.26 |
| 5,904,759 | 5/1999 | Okuda et al. | 106/31.26 |
| 5,948,151 | 9/1999 | Ono et al. | 106/31.26 |
| 5,981,625 | 11/1999 | Zou et al. | 106/31.26 |

FOREIGN PATENT DOCUMENTS

| | | |
|---|---|---|
| 6107998 | 4/1994 | Japan . |
| 8100142 | 4/1996 | Japan . |
| 931384 | 2/1997 | Japan . |
| 9268268 | 10/1997 | Japan . |

Primary Examiner—Helene Klemanski
Attorney, Agent, or Firm—Lorusso & Loud

[57] ABSTRACT

A water-in-oil type emulsion ink for stencil printing, including 10–90% by weight of an oil phase and 90-10% by weight of an aqueous phase, the oil phase containing a mineral oil having a viscosity of greater than 10.0 mm²/s at 40° C. and such a carbon content distribution that a naphthenic carbon content $C_N$ is at least 34% and an aromatic carbon content $C_A$ is not greater than 20%

11 Claims, No Drawings

WATER-IN-OIL TYPE EMULSION INK FOR STENCIL PRINTING

BACKGROUND OF THE INVENTION

This invention relates to an emulsion ink of a water-in-oil type useful for stencil printing.

In stencil printing, an ink is applied onto a perforated stencil master backed by a printing paper and is passed through the perforations to form an image on the printing paper. Since a pattern of an emulsion ink printed on a paper is dried by evaporation and penetration, fixation property of the ink is one of the very important aspect of the emulsion ink for stencil printing. In this connection, it is also important that the ink should not be solidified before being applied onto a paper. It is also desired that the ink should no emit an unpleasant odor. Known w/o type emulsion ink, however, is not satisfactory in these points.

For example, JP-A-6-107998 discloses a w/o type emulsion ink containing a liquid alkyd resin and a solvent containing a small aromatic compound content. This ink has a problem because the solvent is volatile in nature. Thus, when the printer containing the ink is maintained unused for a few months, the ink is dried to cause clogging of the screen.

JP-A-9-268268 and JP-A-9-31384 disclose a w/o type emulsion ink using a motor oil. The ink has a problem because the motor oil emits an unpleasant odor and because the viscosity of the motor oil significantly varies with the temperature.

SUMMARY OF THE INVENTION

It is, therefore, an object of the present invention to provide a w/o type emulsion ink which is suited for stencil printing and which can solve the above problems of the conventional inks.

Another object of the present invention is to provide a w/o type emulsion ink which does not emit an unpleasant odor, which does not solidify during storage in a printer and whose viscosity has little temperature dependency.

It is a further object of the present invention to provide a w/o type emulsion ink which has excellent fixation property when applied onto a paper.

It is yet a further object of the present invention to provide a w/o type emulsion ink which gives uniform solid patterns.

In accomplishing the foregoing object, there is provided in accordance with the present invention a water-in-oil type emulsion ink including 10–90% by weight of an oil phase and 90–10% by weight of an aqueous phase, the oil phase containing a mineral oil having a viscosity of greater than 10.0 mm$^2$/s at 40° C. and such a carbon content distribution that a naphthenic carbon content $C_N$ is at least 34% and an aromatic carbon content $C_A$ is not greater than 20%.

Other objects, features and advantages of the present invention will become apparent from the detailed description of the preferred embodiments to follow.

DETAILED DESCRIPTION OF THE PREFERRED EMBODIMENTS OF THE INVENTION

The w/o type emulsion ink according to the present invention comprises 10–90% by weight of an oil phase and 90–10% by weight of an aqueous phase. The oil phase contains a mineral oil which is generally substantially non-volatile.

The term "non-volatile mineral oil" used in the present specification is intended to refer to a mineral oil having a boiling point of at least 316° C. at 1013 hPa and a vapor pressure of not more than 20 Pa at 20° C.

It is important that the mineral oil should have a viscosity of greater than 10.0 mm$^2$/s at 40° C. in order to minimize the temperature dependency of the viscosity of the ink. The viscosity of the ink is preferably greater than 10.0 mm$^2$/s but not greater than 300 mm$^2$/s, more preferably greater than 10.0 mm$^2$/s but not greater than 120 mm$^2$s, most preferably greater than 10.0 mm$^2$/s but not greater than 60 mm$^2$/s, at 40° C.

It is also important that the mineral oil should have such a carbon content distribution that a naphthenic carbon content $C_N$ is at least 34% and an aromatic carbon content $C_A$ is not greater than 20% in order to obtain an ink which does not emit an unpleasant odor, which does not solidify during storage in a printer and whose viscosity has a low temperature dependency.

The carbon content distribution can be measured by the n-d-M method of structural group analysis (ring analysis) disclosed in Lubricant Handbook p. 344 (edited by Nippon Lubricant Oil Society, published by Youkendo). For example, an oil having $C_P$ of P%, $C_N$ of N% and $C_A$ of A% means that the percentage of the number of the paraffinic carbons thereof based on the total carbon number thereof is P% (P %$C_P$), that the percentage of the number of the naphthenic carbons thereof based on the total carbon number thereof is N% (N %$C_N$), and that the percentage of the number of the aromatic carbons thereof based on the total carbon number thereof is A% (A %$C_A$).

Illustrative of suitable mineral oils having the above carbon content distribution are Diana Process Oil NM-280, NR-68, NR-26, NP-24 and NS-24 (manufactured by Idemitsu Kosan Co., Ltd.), Diana Fresia N-28, N-90, N-150, U-46, U-56, U-68, U-130, U-170 and U-260 (manufactured by Idemitsu Kosan Co., Ltd.), Sunthene Oil 310, 410, 415, 420, 430, 450, 380, 480, 3125, 4130 and 4240 (manufactured by Japan Sun Co., Ltd.), Gargoyle Arctic Oil 155 and 300ID (manufactured by Mobil Sekiyu Kabushiki Kaisha), Mobil Vacuorin Extraheavy and Mobil DTE Extraheavy (manufactured by Mobil Sekiyu Kabushiki Kaisha). These naphthenic mineral oils may be used singly or in combination of two or more thereof.

It is preferred that the aromatic carbon content $C_A$ of the mineral oil be not higher than 5% for reasons of obtaining odorless inks. Such mineral oils may be, for example, Gargoyle Arctic Oil Light and Gargoyle Arctic Oil C-Heavy (manufactured by Mobil Sekiyu Kabushiki Kaisha).

In addition to the mineral oils described above, the oil phase may contain one or more oils as long as the objects of the present invention are not adversely affected thereby. Illustrative of such oils are petroleum solvents, liquid paraffins, spindle oils, machine oils, lubricant oils, other mineral oils, synthetic oils and vegetable oils (e.g. tall oil, linseed oil, corn oil, olive oil, rapeseed oil, castor oil, dehydrated castor oil, coconut oil and soybean oil). It is desired that these oils have a low aromatic compound content.

From the standpoint of safety, it is preferred that the petroleum solvent (volatile solvent) have a viscosity of not greater than 10 mm$^2$/s at 40° C., an aniline point (in accordance with Japanese Industrial Standard JIS K 2256) of not higher than 100° C. and a aromatic compound content (in accordance with Japanese Industrial Standard JIS K 2536) of not greater than 1% by weight. Illustrative of suitable petroleum solvents are ISOPAR C, E, G, H, L and M (manufactured by Exxon Chemicals Co., Ltd.), EXXSOL D-30, D-40, D-80, D-110 and D-130 (manufactured by Exxon Chemicals Co., Ltd.), and AF Solvent #4, #5, #6 and #7 (manufactured by Nippon Oil Co., Ltd.). The content of the petroleum solvent is preferably at least 10% by weight but less than 40% by weight based on the total liquid components in the oil phase.

The oil phase may contain a second type of a non-volatile mineral oil in addition to the above-described first type of the mineral oil. The second mineral oil has a viscosity of greater than 10.0 mm$^2$/s at 40° C. and such a carbon content distribution that a naphthenic carbon content $C_N$ is less than 34% and an aromatic carbon content $C_A$ is not greater than 20%. Illustrative of the second mineral oils are Nisseki Super Oils B, C, D, E (manufactured by Nippon Oil Co., Ltd.), Gargoyle Arctic 1010, 1022, 1032, 1046, 1068 and 1100 (manufactured by Mobil Sekiyu Kabushiki Kaisha), Mobil Vacuorin Extraheavy and Mobil DTE Extraheavy (manufactured by Mobil Sekiyu Kabushiki Kaisha), Sunpar Oil 110, 115, 120, 130, 150, 2100 and 2280 (manufactured by Japan Sun Co., Ltd.), and Diana Process Oil PX-90, PW-32, PW-90, PW-380, PS-32, PS-90 and PS-430 (manufactured by Idemitsu Kosan Co., Ltd.). These oils may be used singly or in combination of two or more thereof.

It is preferred that the oil phase have a content of non-volatile mineral oil having a viscosity of greater than 10 mm$^2$/s at 40° C. in an amount of at least 25% by weight, more preferably at least 30% by weight, and most preferably at least 50% by weight, based on a total amount of the oil phase. Further, for reasons of safety, the oil phase preferably have no more than 3% by weight of a content of polycyclic aromatic compounds including aromatic compounds having at least three condensed aromatic rings.

In addition to the above oil components, the oil phase may contain an emulsifier, a resin, an oil-insoluble coloring agent, a dispersing agent for the coloring agent, a loading pigment, a gelation agent, an oxidation inhibitor and other conventional additives.

The emulsifier is used for the formation of a water-in-oil type emulsion. An anionic surfactant, a cationic surfactant, an amphoteric surfactant or a nonionic surfactant may be used as the emulsifier. Both high and low molecular weight emulsifier may be used. The emulsifier is preferably a nonionic surfactant such as a fatty acid ester of sorbitan (e.g. sorbitan monooleate, sorbitan sesquioleate, sorbitan trioleate or sorbitan monostearate), a fatty acid ester of polyoxyethylene-sorbitan (e.g. polyoxyethylenesorbitan monooleate or polyoxyethylenesorbitan trioleate),a mono-, di-, tri- or polyglyceride of a fatty acid (e.g. glyceryl monostearate, decaglyceryl trioleate or hexaglycerin polyricinoleate), a polyoxyethylenesorbitol fatty acid ester, a polyoxyethyleneglycerol fatty acid ester (e.g. a polyoxyethyleneglycerol plant oil fatty acid ester), an etylene oxide addition product of a fatty acid, a higher alcohol or alkylphenol (e.g. polyoxyethylene alkyl ether or polyoxyethylene alkylphenyl ether), a polyoxyethylenealkylamine fatty acid amide, a polyoxyethylene polyoxypropylene alkyl ether, polyoxyethylene castor oil or polyoxyethylene hydrogenated castor oil. These surfactants may be used singly or in combination of two or more thereof. The emulsifier is used in an amount of 0.5–15% by weight, preferably 2–8% by weight, based on the weight of the ink.

Illustrative of suitable resins are rosin; rosin derivatives such as polymerized rosin, hydrogenated rosin, esterified rosin, hydrogenated and esterified rosin; rosin-modified resins such as rosin polyester resins, rosin-modified alkyd resins, rosin-modified maleic acid resins and rosin-modified phenol resins; maleic acid resins; phenol resins; petroleum resins; alkyd resins; rubber-derived resins such as cyclized rubbers; terpene resins; and polymerized castor oil. These resins may be used singly or as a mixture of two or more thereof. Rosin-modified phenol resins such as TAMANOL 353, TAMANOL 403, TAMANOL 361, TAMANOL 387, TAMANOL 340, TAMANOL 400, TAMANOL 396, TAMANOL 354, KG-836, KG-846, KG-1834 and KG1801 (products of Arakawa Kagaku Kogyo Kabushiki Kaisha) are preferably used.

The resin preferably has a weight average molecular weight of 30,000–150,000, more preferably 55,000–150,000, for reasons of fixing property and printing property of the ink. It is also preferred that 1 g of the resin can be compatible with at least 1 g of Nisseki #0 Solvent H. The resin is preferably used in an amount of 2–50% by weight, more preferably 5–20% by weight, based on the weight of the oil phase. Too large an amount of the resin and too high a molecular weight of the resin would cause a problem of ink leakage, while a too small an amount and a too low a molecular weight of the resin would cause a problem in fixation of the ink.

The alkyd resin is constituted from a polybasic acid, a polyhydric alcohol and a fat or oil. Examples of the polybasic acids include phthalic anhydride, isophthalic acid, terephthalic acid, succinic acid, adipic acid, sebacic acid, tetrahydrophthalic acid, maleic acid, maleic anhydride, fumaric acid, itaconic acid and citraconic anhydride. Examples of polyhydric alcohols include ethylene glycol, diethylene glycol, triethylene glycol, polethylene glycol, propylene glycol, trimethylene glycol, tetramethylene glycol, glycerin, trimethylolpropane, neopentyl glycol, diglycerin, triglycerin, penthaerythritol, dipentaerythritol, mannitol and sorbitol. Examples of fats and oils include non-drying oil and semi-drying oil having an iodine value of 80 or less and fatty acids of these oils, such as coconut oil, palm oil, olive oil, castor oil, rice oil and cotton oil. Drying oil such as soybean oil, tung oil and linseed oil may also be used as long as the resulting alkyd resin has an iodine value of 80 or less.

The alkyd resin to be used as the relatively low molecular weight resin preferably has an oil length of 60–90 and a iodine value of 80 or less. The term "oil length" of the alkyd resin used herein is intended to refer to a percentage of the weight of the fatty acids contained in the fat and oil based on the weight of the alkyd resin when calculated in terms of triglycerides. The alkyd resin preferably has a molecular weight of 30,000 or less, more preferably 10,000 or less.

The coloring agent incorporated into the oil phase may be any known pigment or dispersing dye. An insoluble pigment or dye is preferably used. Examples of the coloring agents include carbon black such as acetylene black, channel black and furnace black; metal powder such as aluminum powder and bronze powder; inorganic pigments such as red oxide of iron, chrome yellow, ultramarine blue, chromium oxide and titanium oxide; azo pigments such as insoluble azo pigments, azo lake pigments and condensed azo pigments; phthalocyanin pigments such as metal-free phthalocyanin pigments and a copper phthalocyanin pigment; condensed polycyclic pigments such as anthraquinone pigments, quinacridone pigments, isoindolinone pigments, isoindolin pigments, dioxazine pigments, threne pigments, perylene pigments, perinone pigments, thioindigo pigments, quinophthalone pigments and metal complex pigments; organic pigments such as lake of acid or basic dyes; and oil-soluble dyes such as diazo dyes and anthraquinone dyes. These pigments and dyes may be used singly or in combination of two or more thereof.

The coloring agent is incorporated at least one of the oil phase and the aqueous phase. Thus, the above exemplified coloring agents may be also used for the incorporation into the aqueous phase. The pigment to be dispersed in the oil phase and/or aqueous phase preferably has an average particle size of 0.1–10 μm, more preferably 0.1–1 μm. The amount of the pigment is suitably determined according to the intended color density of the prints and is generally in an amount of 2–15% by weight based on the ink.

When carbon black is used as the pigment, acidic carbon black having a pH of less than 5 is preferably used for incorporation into the oil phase, while alkaline carbon black having a pH of 5 or more, more preferably 6–10, most preferably 7–9 is preferably used for incorporation into the aqueous phase. Examples of suitable carbon black pigments include Carbon Black MA-100, MA-77, MA-11, #40 and #44 (products of Mitsubishi Chemical Corporation) and Raven 1080, Raven 1255, Raven 760, Raven 410 and Raven 1100 (products of Columbian Carbon Japan Ltd.).

The dispersing agent for the pigment may be, for example, alkylamines having a high molecular weight, aluminum chelate compounds, styrene-maleic anhydride copolymers, high molecular weight polycarboxylic acid esters, aliphatic polycarboxylic acids, amine salts of polyesters, ester-type anionic surfactants, long chain amine salts of high molecular weight polycarboxylic acids, salts of long chain polyaminoamides with polyesters, polyamides, phosphoric acid ester surfactants, salts of alkylsulfocarboxylic acids, salts of a-olefinsulfonic acids, salts of dioctylsulfosuccinic acid, polyethylene imines, salts of alkylolamines and resins capable of dispersing the insoluble pigments such as alkyd resins. An anionic, cationic or amphoteric surfactant may also be used as the dispersing agent as long as it does not adversely affect the storage stability of the ink.

The above-described dispersing agents may be used singly or as a mixture of two or more. The dispersing agent is used in combination with the pigment and, thus, may be incorporated into the oil phase and/or aqueous phase. The dispersing agent which is not a resin or a polymer is used in an amount of 40% by weight or less, preferably 2–35% by weight, based on the weight of the pigment. A resin or a polymer dispersing agent such as an alkyd resin is used in an amount of at least 0.05 part by weight per part by weight of the pigment.

The loading pigment incorporated into the oil phase serves to control the viscosity of the ink and to prevent ink blurs. The loading pigment may be incorporated into the oil phase and/or aqueous phase. The loading pigments may be fine particles of inorganic materials such as clay, silica, talc, calcium carbonate, barium sulfate, titanium oxide, alumina, diatomaceous earth, kaolin, mica and aluminum hydroxide, or fine particles of organic materials such as polyacrylic ester, polyurethane, polyester, polyethylene, polypropylene, polyvinyl chloride, polyvinylidene chloride, polystyrene, polysiloxane, phenol resins, epoxy resins and copolymers thereof.

Illustrative of suitable loading pigments are Aerosil 200, Aerosil 972 (products of Nippon Aerosil Co., Ltd.), NEW D ORBEN (products of Shiroishi Kogyo Co., Ltd.), BEN-GEL, S-BEN, ORGANITE (products of Hojun Yoko Co., Ltd.), TIXOGEL VE, DS, GB, VG and EZ-100 and OPTI-GEL (products of Nissan Girdler Catalyst Co., Ltd.). The loading pigment is used in an amount of 0.01–50% by weight, preferably 0.01–10% by weight, based on the ink.

The gelation agent serves to form a gel of the resin contained in the oil phase and to improve the storage stability, fixation property and fluidity of the ink. Thus, it is preferred that the gelation agent be capable of forming a coordinate bond with the resin contained in the oil phase. Illustrative of suitable gelation agents are organic acid salts, organic chelates or metal soap oligomers containing Li, Na, K, Al, Ca, Co, Fe, Mn, Mg, Pb, Zn or Zr. Specific examples of the gelation agent include metal salts of octylic acid such as aluminum octylate, metal salts of naphthenic acid such as manganese naphthenate, metal salts of stearic acid such as zinc stearate, and organic chelates such as aluminum diisopropoxide monoethylacetoacetate. These gelation agents may be used singly or as a mixture of two or more thereof and is generally used in an amount of not more than 15% by weight, preferably 5–10% by weight, based on the weight of the resin in the oil phase.

The oxidation inhibitor to be incorporated into the oil phase may be, for example, dibutylhydroxytoluene, propyl gallate and butylhydroxyanisole and is generally used in an amount of 2% by weight or less, preferably 0.1–1% by weight, based on the weight of the solvent. If desired, two or more oxidation inhibitors may be used in combination. The oxidation inhibitor serves to prevent the oxidation of binder resin to thereby prevent an increase of the viscosity of the ink.

If desired, a wax may be incorporated into the oil phase for the purpose of improving separation between a printing drum and printing paper or of preventing the sticking of printing paper.

The aqueous phase may contain water, an insoluble pigment, a dispersing agent for the pigment, a loading pigment, an electrolyte, a water-soluble polymer and an oil-in-water (o/w) type resin emulsion (hydrophobic polymer). An antifreezing agent, a mildew-proof agent (antiseptic agent), and a pH controlling agent may also be suitably incorporated into the aqueous phase.

The electrolyte serves as an emulsion stabilizer. A salt providing anions such as citrate ions, tartrate ions, sulfate ions and acetate ions, or a salt providing cations such as alkali metal ion and alkaline earth metal ions may be suitably used. Illustrative of suitable electrolytes are magnesium sulfate, sodium sulfate, sodium citrate, sodium hydrogenphosphate, sodium borate, aluminum sulfate and sodium acetate. These electrolytes may be used singly or in combination of two or more thereof. The electrolyte is generally used in an amount of 0.1–2% by weight, preferably 0.5–1.5% by weight, based on the weight of the aqueous phase.

The water-soluble polymer serves as a viscosity controlling agent, a wetting agent for the prevention of drying of the aqueous phase and a dispersing agent for pigments. Both natural and synthetic polymers may be used. Examples of water-soluble natural polymers include starch, mannan, sodium alginate, galactan, tragacanth rubber, gum Arabic, pullulan, dextran, xanthan rubber, gelatin, collagen, casein and glue. Examples of water-soluble synthetic polymers include carboxymethyl cellulose, methyl cellulose, hydroxyethyl cellulose, hydroxymethyl starch, carboxymethyl starch, dialdehyde-type starch, acrylic resins, sodium salt of polyacrylic acid, polyvinyl alcohol, polyvinyl pyrrolidone, polyacrylamide, poly-N-alkylsubstituted acrylamide, poly-N,N-dialkylsubstituted acrylamide, polyethylene oxide, polyvinyl methyl ether, styrene-maleic anhydride copolymer, styrene-acrylic acid copolymer and a polymer obtained by incorporating alkyl groups into the above copolymer for imparting hydrophobicity. Acrylamide polymers and acrylic polymers may be of a partly hydrophobic copolymer-type in which alkyl groups are incorporated into part of the monomer units. A block-copolymer of polyethylene and polypropylene or polybutylene may also be used. The above water-soluble polymers may be used singly dr in combination with two or more thereof. A water-soluble polymer showing a surface tension of not greater than 65 mN/m when dissolved in water to have a concentration of 1 g/dL may be used. The amount of the water-soluble polymer is generally 25% by weight or less, preferably 0.5–15% by weight, based on the weight of the water contained in the ink.

The o/w type emulsion serves to improve drying property of the stencil ink and to function as a dispersing agent and contains a synthetic or natural polymer. The synthetic polymer may be, for example, polyvinyl acetate, polyvinyl chloride, polyacrylate, polymethacrylate, ethylene-vinyl acetate copolymer, vinyl acetate-acrylic ester copolymer, styrene-acrylic ester copolymer, vinylidene chloride-acrylic ester copolymer, vinylidene chloride-acrylic ester copolymer, vinyl chloride-vinyl acetate copolymer, vinyl chloride-vinyl acetate copolymer and polyurethane. The natural polymer as used in the oil phase may be used for the formation of the o/w type emulsion. Two or more different kinds of o/w type emulsions may be used, if desired. It is preferred that the o/w emulsion have a minimum film forming temperature of not higher than 40° C. The emulsion may be prepared in any known emulsifying method using a suitable dispersing agent, a protective colloid or a surfactant. Soap-free emulsion polymerization may also produce the o/w type emulsion. The o/w type emulsion is used in such an amount that the hydrophobic polymer is present in an amount of 2–50% by weight, preferably 3–20% by weight, based on the weight of the aqueous phase.

The mildew-proof agent is used for the prevention of growth of molds or germs in the ink during storage. It is recommendable to use the mildew-proof agent when the emulsion ink of the present invention is intended to be stored for a long period of time. Illustrative of suitable mildew-proof/antiseptic agent are aromatic hydroxyl compounds or their chlorinated derivatives such as salicylic acid, phenol compounds, p-oxybenzoate compounds such as methyl p-oxybenzoate and ethyl p-oxybenzoate, isothiazolin compounds, mixtures of triazine compounds with pyridine compounds, sorbic acid and dehydroacetic acid. These compounds may be used singly or in combination of two or more thereof. The mildew-proof agent is generally used in an amount of not greater than 3% by weight, preferably 0.1–1.2% by weight, based on the weight of the water in the ink.

The antifreezing agent which may also serve as a wetting agent may be, for example, glycols such as ethylene glycol, diethylene glycol and propylene glycol, lower alcohols such as methanol, ethanol, isopropanol, butanol and isobutanol, and polyhydric alcohols such as glycerin and sorbitol. These compounds may be used singly or in combination of two or more thereof. The amount of the antifreezing agent is generally not greater than 15% by weight, preferably 4–12% by weight, based on the weight of the water in the ink.

The pH controlling agent is used to maintain the pH of the ink at a suitable range of, for example, 6–8. Low molecular weight amines or alkanol amines such as diisopropanol amine, di-2(ethylhexyl)amine, triethanolamine, triamylamine, β-dimethylamino-propionitrile, dodecylamine and morpholine, and inorganic compounds such as sodium hydroxide, potassium hydroxide and sodium acetate are examples of the pH controlling agents. The pH-controlling agent, especially triethanolamine or sodium hydroxide, can serve to increase the viscosity of the ink by incorporation of the water-soluble polymer.

If desired, other conventional additives such as a preservative for the prevention of rust of a printer and an antifoaming agent may be incorporated into the aqueous phase in a suitable amount.

The w/o type emulsion ink according to the present invention may be prepared by any known method. For example, an oil phase in the form of an aqueous dispersion containing, for example, a pigment, an emulsifier, a resin and other additives is prepared at room temperature. An aqueous phase containing a water-soluble polymer, an electrolyte and other additives is then gradually mixed with the oil phase to form an emulsion.

The viscosity of the ink may be adjusted also by stirring conditions for the formation of the emulsion. It is desirable to adjust the viscosity of the ink to 3–40 Pa.s, more preferably 10–30 Pa.s, at a shear rate of 20 s$^{-1}$, though any viscosity may be adopted as long as the ink can meet with a given printing system. It is also desirable to adjust the viscosity of the oil phase to 0.01–20 Pa.s, more preferably 0.1–3 Pa.s, at a shear rate of 20 s$^{-1}$.

The following examples will further illustrate the present invention. Parts are by weight.

Mineral oils used in the following Examples and Comparative Examples have the properties shown in Table 1 below.

TABLE 1

| Mineral Oil | $C_A$ (%) | $C_N$ (%) | $C_P$ (%) | Viscosity at 40° C. (mm$^2$/s) | Viscosity at 100° C. (mm$^2$/s) |
| --- | --- | --- | --- | --- | --- |
| A1*1 | 10 | 43 | 47 | 19.9 | 3.6 |
| A2*2 | 16 | 35 | 49 | 54.7 | 6.6 |
| A3*3 | 12 | 42 | 46 | 97.0 | 8.0 |
| A4*4 | 13 | 43 | 44 | 143.2 | 9.9 |
| A5*5 | 14 | 44 | 42 | 390.1 | 16.1 |
| A6*6 | 1 | 54 | 45 | 12.6 | 2.8 |
| A7*7 | 3 | 47 | 50 | 43.5 | 5.6 |
| B1*8 | 26 | 39 | 35 | 26.9 | 4.0 |
| B2*9 | 42 | 31 | 27 | 13.1 | 2.5 |
| B3*10 | 0 | 33 | 67 | 31.0 | 5.5 |

*1: Sunthene Oil 310 (Japan Sun Oil Co., Ltd.)
*2: Gargoyle Arctic Oil 300ID (Mobil Sekiyu Kabushiki Kaisha)
*3: Sunthene Oil 450 (Japan Sun Oil Co., Ltd.)
*4: Sunthene Oil 480 (Japan Sun Oil Co., Ltd.)
*5: Sunthene Oil 4240 (Japan Sun Oil Co., Ltd.)
*6: Gargoyle Arctic Light (Mobil Sekiyu Kabushiki Kaisha)
*7: Gargoyle Arctic C Heavy (Mobil Sekiyu Kabushiki Kaisha)
*8: Diana Process Oil NM-26 (Idemitsu Kosan Co., Ltd.)
*9: Diana Process Oil AC-12 (Idemitsu Kosan Co., Ltd.)
*10: Diana Process Oil PW-32 (Idemitsu Kosan Co., Ltd.)

In the following Examples and Comparative Examples, an alkyd resin was used as a liquid resin. The alkyd resin was prepared from 76 parts of a coconut oil, 7 parts of pentaerythritol and 17 parts of isophthalic acid. As a volatile solvent, AF-5 Solvent (viscosity: 4.2 cSt at 40° C., naphthenic component: 76.8% by weight, aromatic compound content (according to JIS K2536): 0.2% by weight, product of Nippon Oil Co. Ltd.) was used. As a solid resin, a rosin polyester (Pencel PL, MW: 10,000) or a rosin-modified phenol resin (KG846, MW: 80,000 or Tamanol 361, MW: 25,000) was used. These solid resins are products of Arakawa Kagaku Kogyo Co., Ltd. As carbon black, MA-77 (pH: 3.0, product of Mitsubishi Chemical Corporation) or Raven 760 (pH: 7.4, product of Columbian Carbon Japan Ltd.) was used. As a loading pigment, silica (Aerosil R972, product of Nippon Aerosil Inc.) was used. As a water-soluble polymer, sodium polyacrylate (Carbopol 940, product of BF Goodrich Company) or polyvinylpyrrolidone (K30, product of BASF) was used.

EXAMPLE 1

A coloring agent, a mineral oil and a dispersing agent as shown below were mixed and kneaded with three rolls. The resulting dispersion was mixed with a varnish containing an emulsifier as shown below to obtain an oil phase. An aqueous phase containing deionized water, an antifreezing agent, an antiseptic agent and an electrolyte as shown below was gradually added to the oil phase using an emulsifying device to obtain a w/o type emulsion ink having the composition shown below. The ink composition had a weight ratio of the oil phase to the aqueous phase of 26/74 and contained the pigment only in the oil phase. Oil phase

| Oil phase | |
|---|---|
| Coloring agent; carbon black (MA-77 of Mitsubishi Chemical Corporation, pH: 3) | 4.5 parts |
| phthalocyanine blue | 0.5 part |
| Mineral oil; A1 | 16.5 parts |
| Dispersing agent; aluminum chelate | 0.5 part |
| Emulsifier; sorbitan sesquioleate | 4.0 parts |
| Aqueous phase | |
| Water; deionized water | 62.9 parts |
| Antifreezing agent; ethylene glycol | 10.0 parts |
| Electrolyte; magnesium sulfate | 1.0 part |
| Antiseptic agent; methyl p-oxybenzoate | 0.1 part |

EXAMPLE 2

Example 1 was repeated in the same manner as described except that the mineral oil A1 (16.5 parts) was replaced by the mineral oil A7 (16.5 parts), that silica (1.0 part) as a loading pigment was incorporated into the dispersion, that AF-5 Solvent (1.0 part) as a volatile solvent was incorporated into the vanish and water was used in an amount of 60.9 parts, thereby to obtain a w/o type emulsion ink having a weight ratio of the oil phase to the aqueous phase of 28/72 and containing the pigment only in the oil phase.

EXAMPLE 3

Example 1 was repeated in the same manner as described except that the mineral oil A1 (16.5 parts) was replaced by the mineral oil A3 (19.5 parts) and that water was used in an amount of 59.9 parts, thereby to obtain a w/o type emulsion ink having a weight ratio of the oil phase to the aqueous phase of 29/71 and containing the pigment only in the oil phase.

EXAMPLE 4

Example 1 was repeated in the same manner as described except that the mineral oil A1 (16.5 parts) was replaced by the mineral oil A2 (18.5 parts) and that water was used in an amount of 60.9 parts, thereby to obtain a w/o type emulsion ink having a weight ratio of the oil phase to the aqueous phase of 28/72 and containing the pigment only in the oil phase.

EXAMPLE 5

Example 1 was repeated in the same manner as described except that the mineral oil A1 (16.5 parts) was replaced by a combination of the mineral oil A6 (6.0 parts) and mineral oil A7 (12.5 parts) and that water was used in an amount of 60.9 parts, thereby to obtain a w/o type emulsion ink having a weight ratio of the oil phase to the aqueous phase of 28/72 and containing the pigment only in the oil phase.

EXAMPLE 6

Example 1 was repeated in the same manner as described except that the mineral oil A1 (16.5 parts) was replaced by the mineral oil A7 (10.0 parts), that silica (1.0 part) as a loading pigment was incorporated into the dispersion, that AF-5 Solvent (5.0 parts) as a volatile solvent was incorporated into the vanish and water was used in an amount of 63.4 parts, thereby to obtain a w/o type emulsion ink having a weight ratio of the oil phase to the aqueous phase of 25.5/74.5 and containing the pigment only in the oil phase.

EXAMPLE 7

Example 1 was repeated in the same manner as described except that the mineral oil A1 (16.5 parts) was replaced by the mineral oil A4 (20.5 parts) and water was used in an amount of 58.9 parts, thereby to obtain a w/o type emulsion ink having a weight ratio of the oil phase to the aqueous phase of 30/70 and containing the pigment only in the oil phase.

EXAMPLE 8

Example 1 was repeated in the same manner as described except that 1.0 part of a liquid resin (alkyd resin) was incorporated into the vanish, that the mineral oil A1 (16.5 parts) was replaced by a combination of the mineral oil A2 (6.6 parts) and the mineral oil B3 (9.9 parts), and that water was used in an amount of 61.9 parts, thereby to obtain a w/o type emulsion ink having a weight ratio of the oil phase to the aqueous phase of 27/73 and containing the pigment only in the oil phase.

EXAMPLE 9

Example 8 was repeated in the same manner as described except that the amount of the mineral oil A2 was decreased to 3.5 parts and the amount of the mineral oil B3 was increased to 14.0 parts and that water was used in an amount of 60.9 parts, thereby to obtain a w/o type emulsion ink having a weight ratio of the oil phase to the aqueous phase of 28/72 and containing the pigment only in the oil phase.

EXAMPLE 10

Example 1 was repeated in the same manner as described to obtain a w/o type emulsion ink having the composition shown below. Solid and liquid resins and a volatile solvent were incorporated into the vanish. The composition had a weight ratio of the oil phase to the aqueous phase of 30/70 and contained the pigment only in the oil phase.

| Oil phase | |
|---|---|
| Coloring agent; carbon black (MA-77 of Mitsubishi Chemical Corporation, pH: 3) | 4.0 parts |
| Mineral oil; A6 | 12.6 parts |
| Dispersing agent; aluminum chelate | 0.4 part |
| Volatile solvent; AF-5 Solvent | 4.8 parts |
| Solid resin; rosin polyester (PE-PL) | 3.2 parts |
| Liquid resin; alkyd resin | 1.0 part |

-continued

| | |
|---|---|
| Emulsifier; sorbitan sesquioleate | 4.0 parts |
| Aqueous phase | |
| Water; deionized water | 58.9 parts |
| Antifreezing agent; ethylene glycol | 10.0 parts |
| Electrolyte; magnesium sulfate | 1.0 part |
| Antiseptic agent; methyl p-oxybenzoate | 0.1 part |

EXAMPLE 11

Example 10 was repeated in the same manner as described except that rosin-modified phenol resin (Tamanol 361, MW: 25,000) was substituted for the rosin polyester, thereby to obtain a w/o type emulsion ink containing the pigment only in the oil phase.

EXAMPLE 12

Example 10 was repeated in the same manner as described except that rosin-modified phenol resin (KG846, MW: 80,000) was substituted for the rosin polyester, and that the amount of the solvent was increased to 6.8 parts while the amount of the mineral oil A6 was decreased to 10.6 parts, thereby to obtain a w/o type emulsion ink containing the pigment only in the oil phase.

EXAMPLE 13

Example 1 was repeated in the same manner as described except the mineral oil A1 (16.5 parts) was replaced by the mineral oil A5 (22.5 parts) and that the amount of water was decreased to 56.9 parts, thereby to obtain a w/o type emulsion ink having a weight ratio of the oil phase to the aqueous phase of 32/68 and containing the pigment only in the oil phase.

EXAMPLE 14

Water, a pigment, a water-soluble polymer and an o/w type emulsion shown below were mixed with each other for 24 hours using a ball mill to obtain a dispersion, to which an antifreezing agent and an antiseptic agent shown below were mixed to obtain an aqueous phase. The aqueous phase was mixed with an oil phase containing a mineral oil, a volatile solvent and an emulsifier shown below using an emulsifying device to obtain a w/o type emulsion ink having the composition shown below. The ink composition had a weight ratio of the oil phase to the aqueous phase of 22/78 and contained the pigment only in the aqueous phase.

| | |
|---|---|
| Oil phase | |
| Mineral oil; A2 | 15.0 parts |
| Volatile solvent (AF-5) | 3.0 parts |
| Emulsifier; sorbitan sesquioleate | 4.0 parts |
| Aqueous phase | |
| Water; deionized water | 55.9 parts |
| Coloring agent; carbon black (Raven 760) | 4.0 parts |
| Water-soluble polymer; polyvinyl pyrrolidone | 3.0 parts |
| o/w Emulsion; polyacrylate (solid matter content: 50%) | 5.0 parts |
| Antifreezing agent; ethylene glycol | 10.0 parts |
| Antiseptic agent; methyl p-oxybenzoate | 0.1 part |

EXAMPLE 15

Example 14 was repeated in the same manner as described except the mineral oil A2 (15.0 parts) was replaced by the mineral oil A7 (15.0 parts), thereby to obtain a w/o type emulsion ink containing the pigment only in the aqueous phase.

EXAMPLE 16

Example 14 was repeated in the same manner as described except the mineral oil A2 (15.0 parts) was replaced by a combination of the mineral oil A5 (6.0 parts) and mineral oil A6 (12.0 parts), that silica (2.0 parts) as a loading pigment was additionally incorporated into the oil phase, that the volatile solvent was not used, and that the amount of water was decreased to 53.9 parts, thereby to obtain a w/o type emulsion ink containing the carbon black in the aqueous phase and the loading pigment in the oil phase and having a weight ratio of the oil phase to the aqueous phase of 24/76.

EXAMPLE 17

Example 14 was repeated in the same manner as described except the composition of the oil phase was changed as shown below and that the amount of water was decreased to 54.9 parts, thereby to obtain a w/o type emulsion ink having a weight ratio of the oil phase to the aqueous phase of 23/77 and containing the carbon black in the aqueous phase and the loading pigment in the oil phase.

| | |
|---|---|
| Oil phase | |
| Mineral oil; | |
| A6 | 6.0 parts |
| A7 | 6.0 parts |
| Emulsifier; sorbitan sesquioleate | 4.0 parts |
| Loading pigment; silica (Aerosil R972) | 2.0 part |
| Solid resin; rosin-modified phenol resin (KG846, MW: 80,000) | 2.0 parts |
| Volatile solvent (AF-5) | 3.0 parts |

EXAMPLE 18

Example 14 was repeated in the same manner as described except the composition of the oil phase was changed as shown below, the amount of carbon black in the aqueous phase was decreased to 3.0 parts, and that the amount of water was decreased to 54.4 parts, thereby to obtain a w/o type emulsion ink having a weight ratio of the oil phase to the aqueous phase of 24.5/75.5 and containing the pigment in each of the oil phase and the aqueous phase.

| | |
|---|---|
| Oil phase | |
| Coloring agent; carbon black (MA-77 of Mitsubishi Chemical Corporation, pH: 3) | 1.0 parts |
| Solid resin; rosin-modified phenol resin (KG846, MW: 80,000) | 1.5 parts |
| Dispersing agent; aluminum chelate | 0.1 part |
| Volatile solvent (AF-5) | 3.0 parts |
| Mineral oil; | |
| A6 | 3.0 parts |
| A7 | 11.9 parts |
| Emulsifier; sorbitan sesquioleate | 4.0 parts |

EXAMPLE 19

Example 1 was repeated in the same manner as described except the composition of each of the oil phase and the liquid phase was changed as shown below, thereby to obtain a w/o type emulsion ink having a weight ratio of the oil phase to the aqueous phase of 27/73 and containing the pigment only in the oil phase.

| Oil phase | |
| --- | --- |
| Coloring agent; carbon black (MA-77 of Mitsubishi Chemical Corporation, pH: 3) | 4.5 parts |
| phthalocyanine blue | 0.5 part |
| Mineral oil; A3 | 16.5 parts |
| Dispersing agent; aluminum chelate | 0.5 part |
| Volatile solvent; AF-5 | 1.0 part |
| Emulsifier; sorbitan sesquioleate | 4.0 parts |
| Aqueous phase | |
| Water; deionized water | 62.3 parts |
| Antifreezing agent; ethylene glycol | 10.0 parts |
| Water-soluble polymer; sodium polyacrylate | 0.3 part |
| Thickening agent (triethanolamine) | 0.4 part |

COMPARATIVE EXAMPLE 1

Example 1 was repeated in the same manner as described except that the mineral oil A1 (16.5 parts) was replaced by the mineral oil B1 (18.5 parts) and that the amount of water was increased to 60.9 parts, thereby to obtain a w/o type emulsion ink having a weight ratio of the oil phase to the aqueous phase of 28/72 and containing the pigment only in the oil phase.

COMPARATIVE EXAMPLE 2

Example 1 was repeated in the same manner as described except that the mineral oil A1 (16.5 parts) was replaced by a mixture of 15.0 parts of a volatile solvent (AF-5), 1.0 part of a liquid resin (alkyd resin) and 4.0 parts of a solid resin (rosin-modified phenol resin, Tamanol 361, MW: 25,000) and that the amount of water was decreased to 59.4 parts, thereby to obtain a w/o type emulsion ink having a weight ratio of the oil phase to the aqueous phase of 29.5/70.5 and containing the pigment only in the oil phase.

COMPARATIVE EXAMPLE 3

Example 1 was repeated in the same manner as described except that the mineral oil A1 (16.5 parts) was replaced by the mineral oil B2 (17.5 parts) and that the amount of water was increased to 61.9 parts, thereby to obtain a w/o type emulsion ink having a weight ratio of the oil phase to the aqueous phase of 27/73 and containing the pigment only in the oil phase.

COMPARATIVE EXAMPLE 4

Example 14 was repeated in the same manner as described except that the mineral oil A2 (15.0 parts) was replaced by the mineral oil B1 (19.0 parts) and that the amount of water was decreased to 54.9 parts, thereby to obtain a w/o type emulsion ink having a weight ratio of the oil phase to the aqueous phase of 23/77 and containing the pigment only in the aqueous phase.

COMPARATIVE EXAMPLE 5

Comparative Example 2 was repeated in the same manner as described except that the amount of the volatile solvent (AF-5) was reduced to 12.0 parts, that the mineral oil A7 (5.0 parts) was incorporated into the oil phase and that the amount of water was decreased to 57.4 parts, thereby to obtain a w/o type emulsion ink having a weight ratio of the oil phase to the aqueous phase of 31.5/68.5 and containing the pigment only in the oil phase.

Each of the above w/o type emulsion inks was tested for odor, temperature dependency, fixation, storage stability, drying tendency, aggregation and uniformity of a solid pattern according to the following methods. The results are summarized in Tables 2-1, 2-2 and 2-3.

Ink sample is charged in a commercially available stencil printer (Priport VT3920 manufactured by Ricoh Company, Ltd.) and the printing is repeatedly carried out so that the ink is fully distributed throughout the printer. The image density of prints is measured with a reflection type optical densitometer (RD914 manufactured by McBeath Inc.).

Odor:

An odor of an ink sample is evaluated by human olfactory sense and the evaluation is rated as follows:

A: odorless

B: almost no odor

C: slight odor

D: fair odor

Temperature Dependency:

Printing is performed at 10° C. and at 30° C. and an image density of each print is measured. A difference in image density between the two prints is evaluated. The temperature dependency is scored on the basis of the following ratings:

score 10: no difference score 1: considerable difference

Fixation:

An image is rubbed with a rubber eraser to evaluate a difference in image density. The evaluation is rated as follows:

A: no difference

B: almost no difference

C: slight difference

D: fair difference

Storage Stability:

An ink sample is stored in a closed container for 1 year at room temperature. A phase separation is then evaluated. The storage stability is scored on the basis of the following ratings:

score 10: no separation score 1: considerable separation

Drying Tendency:

An ink sample is applied on a glass plate with a bar coater. The ink coating is allowed to stand at room temperature. Evaluation of drying tendency is rated as follows:

A: ink is not dried

B: ink is dried

Aggregation of Resin:

An ink sample containing a solid resin is evaluated for uniformity of the emulsion. Evaluation of aggregation is rated as follows:

A: no aggregates are observed

B: aggregates are slightly observed

C: aggregates are significantly observed

Uniformity of Solid Pattern:

A solid pattern is printed on a paper. The image is observed with a microscope. Evaluation of uniformity of solid pattern is rated as follows:

A: fibers of the paper are completely uniformly colored

B: fibers of the paper are not completely uniformly colored

TABLE 2-1

| Example | 1 | 2 | 3 | 4 | 5 | 6 | 7 | 8 | 9 |
|---|---|---|---|---|---|---|---|---|---|
| Odor | B | A | B | B | A | A | B | B | B |
| Temperature Dependency | 8 | 9 | 7 | 8 | 9 | 9 | 6 | 8 | 8 |
| Fixation | C | C | C | C | C | C | C | C | C |
| Storage Stability | 7 | 7 | 7 | 7 | 6 | 8 | 7 | 7 | 6 |
| Drying Tendency | A | A | A | A | A | A | A | A | A |
| Aggregation of Resin | — | — | — | — | — | — | — | — | — |
| Uniformity of Solid Pattern | B | B | B | B | B | B | B | B | B |

TABLE 2-2

| Example | 10 | 11 | 12 | 13 | 14 | 15 | 16 |
|---|---|---|---|---|---|---|---|
| Odor | B | B | B | B | B | A | A |
| Temperature Dependency | 7 | 7 | 7 | 5 | 9 | 10 | 7 |
| Fixation | B | B | A | C | C | C | C |
| Storage Stability | 9 | 9 | 9 | 7 | 8 | 7 | 7 |
| Drying Tendency | A | A | A | A | A | A | A |
| Aggregation of Resin | A | A | A | — | — | — | — |
| Uniformity of Solid Pattern | B | B | B | B | B | B | B |

TABLE 2-3

| | Example | | | Comparative Example | | | | |
|---|---|---|---|---|---|---|---|---|
| | 17 | 18 | 19 | 1 | 2 | 3 | 4 | 5 |
| Odor | B | B | B | D | B | D | D | B |
| Temperature Dependency | 8 | 8 | 7 | 1 | 6 | 1 | 5 | 5 |
| Fixation | B | B | C | C | B | C | C | B |
| Storage Stability | 9 | 9 | 7 | 8 | 8 | 8 | 7 | 8 |
| Drying Tendency | A | A | A | A | B | A | A | B |
| Aggregation of Resin | A | A | — | — | A | — | — | A |
| Uniformity of Solid Pattern | B | A | B | B | B | B | B | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. H11-070802 filed Mar. 16, 1999, inclusive of the specification and claims, are hereby incorporated by reference herein.

What is claimed is:

1. A water-in-oil type emulsion ink comprising 10–90% by weight of an oil phase and 90–10% by weight of an aqueous phase, said oil phase containing a mineral oil having a viscosity of greater than 10.0 mm$^2$/s at 40° C. and such a carbon content distribution that a naphthenic carbon content $C_N$ is at least 34% and an aromatic carbon content $C_A$ is not greater than 50%.

2. A water-in-oil emulsion ink as claimed in claim 1, wherein said mineral oil has a viscosity of not greater than 300 mm$^2$/s at 40° C.

3. A water-in-oil emulsion ink as claimed in claim 2, wherein said mineral oil has a viscosity of not greater than 120 mm$^2$/s at 40° C.

4. A water-in-oil emulsion ink as claimed in claim 3, wherein said mineral oil has a viscosity of not greater than 60 mm$^2$/s at 40° C.

5. A water-in-oil emulsion ink as claimed in claim 1, wherein said mineral oil accounts for at least 30% by weight of a total amount of a mineral oil having a viscosity of greater than 10.0 mm$^2$/s at 40° C. in said oil phase.

6. A water-in-oil emulsion ink as claimed in claim 1, wherein said aqueous phase contains a water-insoluble coloring agent.

7. A water-in-oil emulsion ink as claimed in claim 1, wherein said oil phase additionally contains a rosin resin selected from the group consisting of rosin-modified phenol resins and rosin polyester resins.

8. A water-in-oil emulsion ink as claimed in claim 7, wherein said rosin resin has a weight average molecular weight of in the range of 30,000 to 150,000.

9. A water-in-oil type emulsion ink as claimed in claim 1, wherein said aqueous phase contains a water-insoluble coloring agent and said oil phase contains an oil-insoluble coloring agent.

10. A water-in-oil emulsion ink as claimed in claim 1, wherein said oil phase additionally contains a volatile solvent having a viscosity of not greater than 10 mm$^2$/s at 40° C., an aniline point of not higher than 100° C. and a aromatic compound content of not greater than 1% by weight.

11. A water-in-oil emulsion ink as claimed in claim 10, wherein said volatile solvent is present in an amount of not less than 10% by weight but less than 40% by weight based on the weight of a liquid content of said oil phase.

* * * * *

UNITED STATES PATENT AND TRADEMARK OFFICE
CERTIFICATE OF CORRECTION

PATENT NO. : 6,156,109
DATED : December 5, 2000
INVENTOR(S) : Asada

It is certified that error appears in the above-identified patent and that said Letters Patent is hereby corrected as shown below:

Column 2,
Line 10, "mm$^2$s" should read -- mm$^2$/s --.

Column 4,
Line 10, "KG1801" should read -- KG-1801 --.

Column 9,
Line 18, delete "Oil phase".

Column 12,
Lines 30 and 31, "Mineral Oil;", "A6" should read -- Mineral Oil; A6 --; and
Lines 59 and 60, "Mineral Oil;", "A6" should read -- Mineral Oil; A6 --.

Column 16,
Line 10, delete "type"; and
Line 16, "50" should read -- 5% --; and
Line 40, delete "type".

Signed and Sealed this

Fourth Day of December, 2001

Attest:

*Nicholas P. Godici*

NICHOLAS P. GODICI
*Attesting Officer*   *Acting Director of the United States Patent and Trademark Office*